United States Patent
Bäbler

(10) Patent No.: US 6,869,472 B2
(45) Date of Patent: Mar. 22, 2005

(54) 2,9-DICHLOROQUINACRIDONE PIGMENT

(75) Inventor: Fridolin Bäbler, Hockessin (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 10 days.

(21) Appl. No.: 10/466,464

(22) PCT Filed: Jan. 24, 2002

(86) PCT No.: PCT/EP02/00728

§ 371 (c)(1),
(2), (4) Date: Jul. 15, 2003

(87) PCT Pub. No.: WO02/064681

PCT Pub. Date: Aug. 22, 2002

(65) Prior Publication Data

US 2004/0065231 A1 Apr. 8, 2004

Related U.S. Application Data

(60) Provisional application No. 60/264,930, filed on Jan. 30, 2001.

(51) Int. Cl.$^7$ .......................... C09B 67/52; C09B 48/00; C09B 67/10
(52) U.S. Cl. .................... 106/497; 106/31.78; 523/160; 524/90; 546/49; 546/56
(58) Field of Search .................. 106/31.78, 497; 523/160; 524/90; 546/49, 56

(56) References Cited

U.S. PATENT DOCUMENTS

| | | | | |
|---|---|---|---|---|
| 3,157,659 A | * | 11/1964 | Werner et al. | 546/56 |
| 4,015,998 A | * | 4/1977 | Jaffe | 106/433 |
| 5,084,573 A | * | 1/1992 | Babler et al. | 546/56 |
| 5,095,056 A | * | 3/1992 | Babler et al. | 524/90 |
| 5,362,780 A | * | 11/1994 | Babler et al. | 524/88 |
| 5,387,281 A | * | 2/1995 | Babler et al. | 106/495 |
| 5,424,429 A | * | 6/1995 | Hendi et al. | 546/49 |
| 5,614,014 A | | 3/1997 | Urban | 106/495 |
| 5,840,901 A | * | 11/1998 | Babler | 546/49 |
| 6,465,652 B1 | * | 10/2002 | Briquet et al. | 546/56 |
| 2001/0016655 A1 | * | 8/2001 | Babler | 546/6 |
| 2002/0078860 A1 | * | 6/2002 | Rice et al. | 106/497 |
| 2004/0138349 A1 | * | 7/2004 | Babler | 524/88 |
| 2004/0138458 A1 | * | 7/2004 | Schadeli et al. | 546/49 |

FOREIGN PATENT DOCUMENTS

| | | |
|---|---|---|
| EP | 0466649 | 1/1992 |
| EP | 0524904 | 1/1993 |
| EP | 0530142 | 3/1993 |
| EP | 000544160 A1 * | 6/1993 |
| EP | 000643109 A1 * | 3/1995 |
| EP | 0666288 | 8/1995 |
| EP | 000495338 B1 * | 11/1995 |
| EP | 000806456 A2 * | 11/1997 |
| EP | 0829523 | 3/1998 |
| EP | 0863186 | 9/1998 |
| EP | 1074587 | 2/2001 |

* cited by examiner

Primary Examiner—Anthony J. Green
(74) Attorney, Agent, or Firm—Tyler A. Stevenson

(57) ABSTRACT

A new high chroma, opaque gamma 2,9-dichloroquinacridone pigment specified by its particle shape and size and characterized by C.I.E color space values in masstone, and a process for its preparation is dislosed. The new gamma 2,9-dichloroquinacridone pigment is especially useful for coloring coating compositions, such as automotive paints, and plastics.

22 Claims, 2 Drawing Sheets

2,9-DICHLOROQUINACRIDONE PIGMENT

This application is a continuation of International Application No. PCT/EP02/00728, filed Jan. 24, 2002, which claims the benefit of U.S. Provisional application No. 60/264,930, filed on Jan. 30, 2001.

The present invention relates to a 2,9-dichloroquinacridone pigment, in particular to a novel form of a gamma 2,9-dichloroquinacridone pigment having a distinguishing color characteristic, its preparation and its use as a pigment in high molecular weight organic materials.

Quinacridones, also referred to as 5,12-dihydroquino[2,3-b]acridine-7,14-diones, are well-known high performance organic pigments. In particular the linear 2,9-dichloroquinacridone of formula (I) is known for its outstanding pigment properties and its use as a magenta pigment.

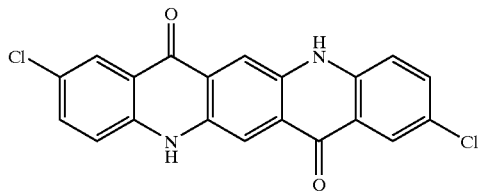

(I)

Several patents describe the preparation and finishing of 2,9-dichloroquinacridone, for example U.S. Pat. No. 3,157,659 describes the preparation of alpha, beta and gamma 2,9-dichloroquinacridone in the presence of sulfuric acid.

Additionally, U.S. Pat. No. 4,895,949 discloses a process for preparing pigmentary solid solutions of at least one quinacridone derivative and the parent quinacridone by milling the starting quinacridone materials at ambient or near ambient temperatures in the presence of an alcohol and a base.

DE-2,753,357 describes a conversion process of a preground 2,9-dichloroquinacridone into a pigmentary form by contacting it with an aqueous alkaline medium at 85° C. in the presence of surfactant(s).

U.S. Pat. No. 5,194,088 describes a process for converting a crude organic pigment into a pigmentary form consisting essentially of premilling the crude pigment and contacting the premilled pigment with a polar organic solvent at a temperature below about 50° C.

A process for pigmenting engineering plastic substrates and coatings comprising incorporating an effective pigmenting amount of 2,9-dichloroquinacridone having a specific surface area of below 30 $m^2/g$ into said engineering plastic or coating is described in the U.S. Pat. No. 5,095,056. The patent particularly emphasizes the increased heat stability of a larger particle size versus a smaller particle size 2,9-dichloroquinacridone.

Indeed larger particle size 2,9-dichloroquinacridone pigments are commercially available with a specific surface area of below 30 $m^2/g$ having excellent heat stability. however, at the cost of other pigment properties. In particular, their chroma and hiding power are still lower than desirable, and their hue is yellowish red. Such pigments have a broad pigment particle size distribution and an irregular particle shape. As shown by electron microscopy, the average aspect ratio of length to width and/or height is at least 5:1, for example from 5:1 to 15:1. The pigment particles show a great variety of shapes.

U.S. Pat. No. 5,084,573 discloses the conversion of a crude 2,9-dichloro-quinacridone into a platelet form in a polar solvent in the presence of an aliphatic long chain sulfur compound and a base.

Surprisingly, 2,9-dichloroquinacridone in its gamma crystal form with an essentially isometric to orthorhombic particle shape (short rod-like with almost orthogonal axes and compact aspect ratio) with an average particle size in the range of 0.1 to 0.8 $\mu$m and a specific surface area in the range of 11 to 23 $m^2/g$ shows an unique magenta (bluish red) color shade with surprisingly high chroma, extremely high opacity and excellent weatherability behavior. Very thin, hiding layers of high gloss can be obtained for example in coatings. As shown by electron microscopy, the average aspect ratio of length to width and/or height is from 1:1 to 3:1.

High chroma and opacity are very desirable pigment properties, both desirable but most difficult to achieve simultaneously. Thus, the new 2,9-dichloroquinacridone pigment is valuable since it offers the paint producer new styling opportunities and the creation of very economic new color shades in particular in combination with other organic, inorganic or effect pigments. Hence, a difference in hue, chroma and opacity can be of considerable commercial importance. Due to the outstanding fastness properties, its excellent rheological properties and unique color characteristics, it is highly suited for use in plastics and coatings applications, particularly in automotive coating systems.

Figure 1:
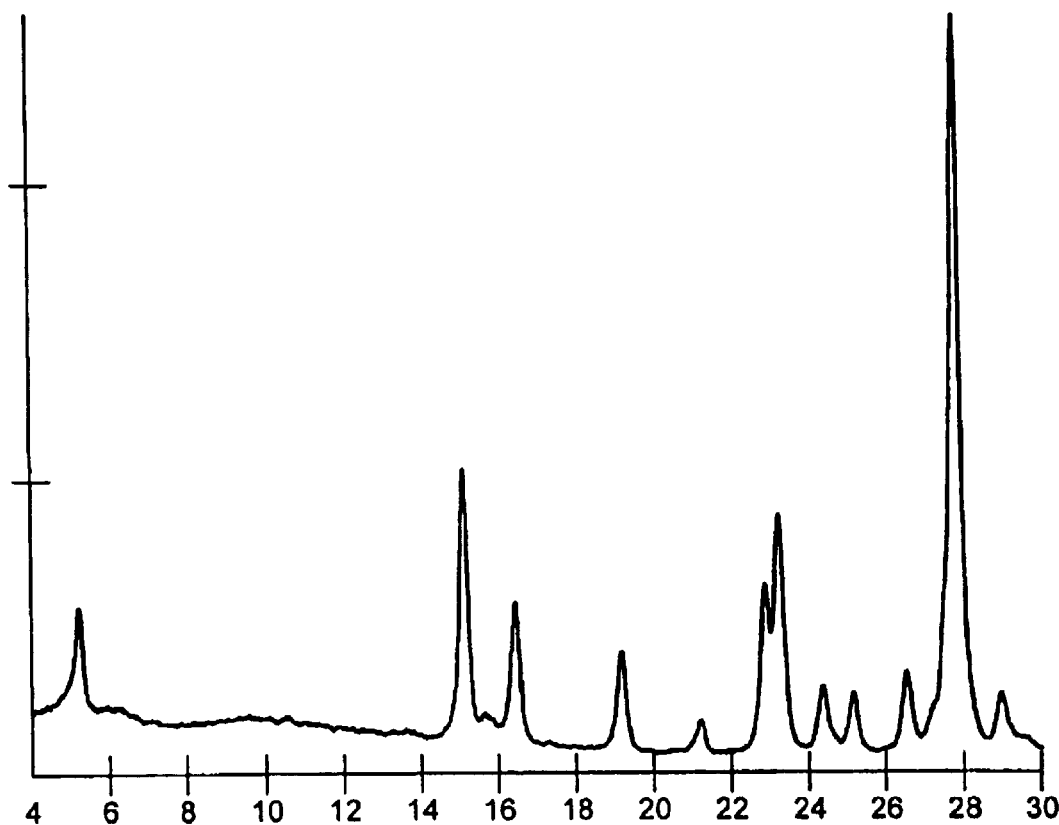
FIG. 1 is an X-ray diffraction pattern of the inventive γ-2,9-dichloroquinacridone pigment. The x-axis reflects the double glancing angles (°2θ) while the y-axis reflects the intensity of the diffracted ray.
Figure 2:
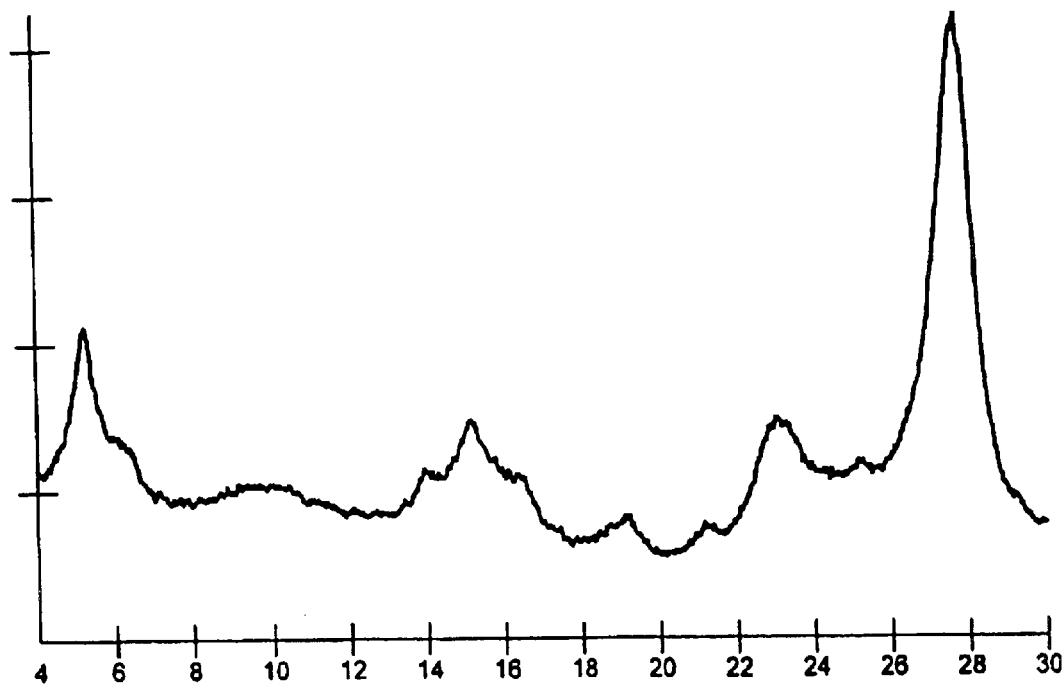
FIG. 2 is an X-ray diffraction pattern of a premilled 2,9-dichloroquinacridone that shows an alpha/gamma 2,9-dichloroquinacridone mixture and a half band width of the peak at 27.8 degree two theta angles of 1.2 to 1.5. The x-axis values are °2θ, while the y-axis values are expanded by a factor of 2.5, as compared with FIG. 1.

The present invention relates to a novel 2,9-dichloroquinacridone pigment which is specified by its crystal form, pigment particle size and shape, its specific surface area and its color characteristics. The color space values are obtained by known measurements (as noted hereafter) from, for example, sprayed paint panels of a pigment masstone. A pigment masstone means that only one pigment is used to color the substrate. The color space values are defined using the hue-angle which is based on the L*C*h system of the Commission Internationale de l'Éclairage (CIE) (DIN 5033 Part 3; DIN 6174). The L*C*h system correlates with the 1976 CIE L*a*b* color space (herein referred as CIELab or CIELab-system).

The color space values of the gamma 2,9-dichloroquinacridone according to the present invention are characterized by the following values:

| CIE color space coordinates | broad range | in particular | preferred | more preferred | most preferred |
|---|---|---|---|---|---|
| L* (lightness) | 35–42 | 35–42 | 36–42 | 36–41 | 37–41 |
| C* (chroma) | ≧40 | 40–47 | 41–47 | 41–47 | 42–47 |
| h (hue angle) | 14–20 | 14–19 | 15–19 | 15–18 | 16–18 |

The color measurements are carried out in a large area view with a spectral component using a ACS Colorimeter Program on an ACS, CS-5 Chromasensor from Applied Color Systems, Inc. and distributed by DATACOLOR International.

In order to measure the color data, the pigment is first incorporated into a substrate, for example, an acrylic paint system such as those described in Example 5 or a polyester paint system such as described in example 9. It is the color of the pigmented substrate such as the coated panel or a pigmented plastic sheet which is then measured. The color is measured at "complete hide", which means that the substrate is pigmented to such an extent that any background color is not observable. At "complete hide" it is not possible to see the background color of a coated panel or the background color through a pigmented plastic sheet (color measurements give identical results, for example with a black or a white panel as background). For practical purposes, it is sufficient to measure at incomplete hide on an acrylic or polyester enamel coating, provided the color difference $\Delta E^*$ measured over a black and white background is less or equal to 8, preferably $\leq 4.8$, and to take the average value of over white and over black for each the lightness (L), the chroma (C*) and the hue angle (h). Optionally, a transparent clear coat can be applied above the pigmented acrylic or polyester enamel so far thin enough in order the color not to be altered.

Appropriate substrates include lacquers, inks, coating compositions, and plastics. Especially appropriate coating compositions include the basecoat/clearcoat systems conventionally used in the automotive industry. Especially appropriate plastics include the polyvinyl halides, especially polyvinyl chloride, and the polyolefins, for example low or linear low density or high density polyethylene, polypropylene, polyester, polyamide and ABS.

The new 2,9-dichloroquinacridone pigment shows a very high opacity for a magenta pigment. The opacity or hiding power is the capacity of a coating material to hide the color or differences in color of a substrate. It is determined by comparative measurement of the reflection of a coating material on a black and white substrate. Black and white glass plates or contrasting cards, for example, can be used as such a substrate.

The instant 2,9-dichloroquinacridone pigment shows the typical X-ray diffraction pattern of gamma 2,9-dichloroquinacridone as depicted in FIG. 1.

Thus, the new gamma 2,9-dichloroquinacridone is characterized by an x-ray diffraction pattern having one strong peak corresponding to $\pm 0.2$ $2\theta$ double glancing angles of 27.8, five medium strength peaks corresponding to 5.2, 15.1, 16.4, 22.9 and 23.3, and seven relatively weak peaks corresponding to 15.7, 19.2, 21.2, 24.4, 25.2, 26.5 and 28.9. For purposes of this application "strong" means having a relative intensity above 60%, "medium" means between 20 and 60% and "weak" means below 20% (see data in Example 1C).

A key feature of the instant gamma 2,9-dichloroquinacridone pigment is its narrow particle size distribution and its primary pigment particle shape of an essentially isometric to orthorhombic like shape with at least 90% of the particles having a width of 0.1 to 0.4 $\mu$m and a length of 0.1 to 0.8 $\mu$m, and with at least 60% of the particles having a width of 0.1 to 0.3 $\mu$m and a length of 0.1 to 0.6 $\mu$m as determined by an electron micrograph. Primary particles can be single or sometimes agglomerated or grown together as twins.

Preferably, the pigment crystal is essentially isometric or tetragonal provided it remains with the following ratios. The average aspect ratio of length to width and/or height is from 1:1 to 3:1; preferably, 1:1 to 2:1; most preferably, 1:1 to 1.5:1. In other words, the ratio of the longer dimension to the shorter dimension is less than 3:1, alternatively greater than 1:1 but less than 3:1. Still further, the ratio of such dimensions is between 1:1 to 2:1. Preferably, at least 60% (more preferably 80% to 100%) of the primary particles fit into this range and have an almost rectangular outline (dihedral angle between opposite faces from 0° to about 20°, preferably from 0° to 10°, most preferred parallel, and dihedral angles between contiguous faces from about 70° to 90°, preferably from 80° to 90°, most preferred orthogonal).

The instant 2,9-dichloroquinacridone pigment shows a specific surface area of 11–23 m²/g, preferably 13–21 m²/g, most preferred 14–19 m²/g as determined by the BET method.

The instant 2,9-dichloroquinacridone also shows an outstanding viscosity behavior when incorporated in a paint system such as for example an automotive paint system.

Additionally, panels sprayed with paints containing the instant 2,9-dichloroquinacridone pigment do not show metamerism and maintain the high chroma magenta color when exposed to different light sources, such as dim or sun or various sources of artificial light.

The instant gamma 2,9-dichloroquinacridone has superior pigment properties, such as a high opacity, excellent rheological properties, heat stability and weatherability behavior, as well as a remarkably good flocculation resistance. It is easily dispersible and develops quickly a high color strength.

Although the instant pigment shows excellent application properties, in order to further improve the pigment properties of the instant gamma 2,9-dichloroquinacridone pigment, texture-improving agents and/or anti-flocculants optionally can be added before, during or after the corresponding preparatory process.

The texture-improving agent and/or anti-flocculant is preferably incorporated into the instant gamma quinacridone pigment in an amount of from 0.05 to 20 percent, most preferably 1 to 10 percent, by weight, based on the combined weights of the gamma 2,9-dichloroquinacridone pigment, texture-improving agent and/or anti-flocculant mixture.

Texture-improving agents are especially useful as an additional component which improves the properties of the instant gamma 2,9-dichloroquinacridone pigment. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines such as laurylamine and stearylamine. In addition, fatty alcohols or ethoxylated fatty alcohols, polyols such as aliphatic 1,2-diols, glycerol mono stearate or polyvinylalcohol and epoxidized soy bean oil, waxes, resin acids and resin acid salts are suitable texture-improving agents.

Anti-flocculants are known in the pigments industry and are often also used as rheology improving agents, for example, pigment derivatives such as sulfonic acid, sulfonic acid salts like metal or quaternary alkylammonium salts or sulfonamide derivatives. Generally, antiflocculants which are derivatives of a pigment from pigment classes such as those described in U.S. Pat. No. 3,386,843 or U.S. Pat. No. 4,310,359 are preferably utilized, which are incorporated herein by reference.

Due to its outstanding chemical resistance, heat stability, weather and light stability, the instant gamma 2,9-dichloroquinacridone pigment is highly suitable for the coloration of various substrates such as inorganic materials and in particular high molecular weight organic materials. Thus, the present invention relates to a method of coloring a high molecular weight organic material which comprises incorporating an effective pigmenting amount of the instant pigment into the high molecular weight organic material and to a composition comprising a high molecular weight organic material and an effective pigmenting amount of the instant gamma 2,9-dichloroquinacridone pigment.

An effective pigmenting amount is any amount suitable to provide the desired color in the high molecular weight organic material. In particular, the instant gamma 2,9-dichloroquinacridone pigment is used in an amount of 0.01 to 30% by weight, preferably 0.1 to 10% by weight, based on the weight of the high molecular weight organic material to be pigmented.

The pigmented, high molecular weight organic materials which are colored with the instant pigment are useful in a variety of applications. For example, the instant pigment is useful for the pigmentation of lacquers, inks, enamel coating compositions and thermoplastic or thermoset polymers.

The high molecular weight organic materials which are colored with the instant pigment generally have a molecular weight in the range of from $10^3$ to $10^8$ g/mol and are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers or copolymers thereof.

High molecular weight organic materials which are useful for heat-curable coatings or cross-linked, chemically-reactive coatings, are also colored with the instant pigment. The pigmented, high molecular weight organic materials prepared according to the present invention are especially useful in finishes which contain customary binders and which are reactive at high temperature. These finishes can be obtained from solvent or aqueous or powder paint systems known in the art. Examples of pigmented, high molecular weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high molecular weight organic materials prepared according to the present invention are also useful as air-drying or physically-drying coatings for example in cosmetics use.

The instant gamma 2,9-dichloroquinacridone pigment is particularly suitable for preparing aqueous and solvent based coatings conventionally employed in the automobile industry, especially in acrylic/melamine resin, alkyd/melamine resin or thermoplastic acrylic resin systems, as well as in powder coatings and UV/EB cured coating systems.

Coatings and ink systems colored with the instant gamma 2,9-dichloroquinacridone pigment possess a high gloss, a high opacity, excellent heat, light and weather fastness, as well as bleed and overspraying fastness properties.

The instant pigment is prepared from 2,9-dichloroquinacridone crude, according to a process the key of which is the pigment crude produced and a finishing step. Suitable finishing processes start from 2,9-dichloroquinacridone obtained by direct pigmentary procedures in which, for example, 2,9-dichloro-6,13-dihydroquinacridone is oxidized to 2,9-dichloroquinacridone pigment in the presence of a catalyst with hydrogen peroxide as oxidant and optionally in the presence of a pigment particle growth and particle phase director.

The 2,9-dichloroquinacridone crude can have any crystal modification or a mixture of crystal modifications such as the known alpha, beta or gamma form, preferably it has a gamma or alpha crystal form or a mixture thereof. The 2,9-dichloroquinacridone crude is premilled optionally in the presence of an inorganic salt such as sodium sulfate, calcium chloride or sodium chloride. In a preferred procedure, the pigment crude is premilled in the presence of 10–30% inorganic salt such as NaCl, $CaCl_2$, $Na_2SO_4$ or $Al_2(SO_4)_3$ with or without water of hydration. The preferred milling mixture composition is 75 to 85% pigment crude and 15–25% anhydrous $Na_2SO_4$.

Premilling, as the term is used herein, refers to milling in the complete absence of liquids, or if liquids are used such as a phase directing solvent or a surface active agent, they are present in such small amounts (maximum of about 10% by weight of pigment) or of such a nature that the mill charge retains the characteristics of a powder and does not in the following solvent treatment step affect the conversion to the instant gamma 2,9-dichloroquinacridone.

The premilling of the 2,9-dichloroquinacridone crude of the above finishing procedure is carried out for example in a horizontal or a vertical bead mill such as an attritor or ball mill or in a high speed mixer known in the industry. The optional presence of an inorganic salt can act as a grinding aid and increase the ability to flow and therefore increase the discharge amount of the resulting premilled powder.

Premilling operations are known and can be accomplished in various ways. Thus, it is possible to premill with 12.7 mm steel balls and roofing nails, or to avoid metal attrition and the corresponding need for pigment extraction with dilute acid, premilling can be accomplished with 12.7 mm high density, high alumina ceramic balls or rods (Diamonite Products Manufacturing, Inc.). Ceramic beads of 0.1 to 2.5 cm, preferably 0.5 to 1.0 cm size made from crystalline zirconia phase and amorphous silica phase by fusion of the oxides are particularly suitable (product of Quartz Products Corporation). Although a variety of sizes of grinding media can be used, the aforementioned sizes are preferred. Grinding apparatuses are known, a ball mill, or an attritor mill filled with metal or porcelain balls, preferably ceramic beads, being suitable.

The resulting premilled powder is highly aggregated and of low crystallinity as shown by the broad peaks of the x-ray diffraction pattern. The premilled powder is specified by the measurements of the half band width of the 27.8 degree two theta angle, which is preferably in the range of 1.0 to 1.5, more preferably 1.2 to 1.5.

Then, the premilled 2,9-dichloroquinacridone is subjected to an aftertreatment in a polar organic solvent. Surprisingly, the premilled 2,9-dichloroquinacridone can be converted to the instant gamma 2,9-dichloroquinacridone only by selected polar solvents, such as di(N—$C_1$–$C_8$-alkyl, preferably methyl)acetamide, formamide, methyl acetamide, methyl formamide, di($C_1$–$C_8$-alky)sulfoxide, sulfolanne, di(N—$C_1$–$C_8$-alkyl)formamide and N—$C_1$–$C_8$-alkyl-pyrrolidone; most preferably, dimethyl sulfoxide (DMSO), dimethyl formamide (DMF) or N-methyl-pyrrolidone (NMP). The skilled artisan will also consider other polar organic solvents chosen amongst such having an oxo group and a dipole moment $\mu$ of from about 2.8 to about 6.0 Debye units (2.8–6.0·$10^{-18}$ esu, measured in benzene at 25° C.), preferably from 3.8 to 5.0 Debye units (3.8–5.0·$10^{-18}$ esu)

and to solvatize. Alternative solvents to be considered should preferably be hydrophilic, most preferably mixable with water in any proportions, such as tetramethylurea.

The premilled pigment or pigment salt mixture is first separated from the grinding media, for example, by sieving and is then suspended in a highly polar solvent, together with the inorganic salt used as a grinding help if applicable.

The after treatment step in the polar solvent is carried out in any suitable equipment, such as a kneader or preferably a vessel with a stirrer, to ensure complete contact between solvent and pigment particles. Preferably the suspension is stirred at a temperature above 60° C. up to 240° C., and most preferably at 100 to 200° C. for 5 minutes to 20 hours, preferably 30 minutes to 5 hours, depending on the desired pigmentary properties of the ultimate product. The highly polar solvent is generally present in an amount ranging from 5 to 20 times the weight of pigment, and preferably 8 to 15 times. The ripening process may be conducted under any pressure (for example from $10^4$ to $10^6$ Pa, optionally in an inert atmosphere, provided the polar solvent is liquid and stable under the ripening conditions.

Contact of the premilled powder with the solvent causes the aggregated pigment powder to deaggregate and undergo particle ripening. Ripening (recrystallisation) is a process in which the particles take the desired shape and size while they are if necessary converted from a partially amorphous state or from an undesired crystal modification to a highly crystalline gamma phase. Owing to the high temperature at which the solvent treatment is conducted, the ripening process can be easily controlled as a function of time.

Advantageously, the instant process does not require the presence of any additives, such as phase directors, growth inhibitors, dispersants or the like, though adding such compounds in customary amounts would of course be feasible. On the contrary, it has been found that better results are obtained in the complete absence of additives.

Another aspect to be considered when preparing the instant gamma 2,9-dichloroquinacridone is the purity of the 2,9-dichloroquinacridone crude to be used. It has surprisingly been found that the higher the purity, the better (more isometric) aspect ratio is obtained. Thus, it is suitable to use a 2,9-dichloroquinacridone crude of high purity—that is, one that contains little of the starting materials, for example the 2,9-dichloro-6,13-dihydroquinacridone or other by-products such as the 2,9-dichloroquinacridone quinone or others generated during the quinacridone synthesis, including synthesis by other than oxidation with hydrogen peroxide.

The high purity 2,9-dichloroquinacridone crude preferably has a purity of at least 97%, most preferably of above 97.5% as measured by a spectroscopic method in which the 2,9-dichloroquinacridone is dissolved in concentrated sulfuric acid. Advantageously, a high purity 2,9-dichloroquinacridone crude is prepared by the oxidation of the 6,13-dihydroquinacridone in the presence of an oxidation promoting catalyst, such as quinone compounds, with hydrogen peroxide as the oxidant as described in the U.S. Pat. No. 5,840,901, which is incorporated herein by reference.

Since the ultimate pigment particle size is generated during the solvent treatment, the pigment can be isolated directly by filtration, washing the presscake with water and/or organic solvents such as alcohols like methanol, ethanol, n-propanol or isopropanol, and drying.

In comparison to commercially available magenta pigments, such as opaque beta quinacridone or other commercially available large particle size 2,9-dichloroquinacridone pigments, the innovative 2,9-dichloroquinacridone exhibits a uniquely high chroma magenta color with a high opacity and outstanding pigment properties.

The instant 2,9-dichloroquinacridone pigments show an extremely high opacity of from ΔE (less than or equal to) ≦8, preferably ≦4.8 and most preferably ≦4.0 suitably measured at in a 25±5 μm thick acrylic or polyester enamel coating system having a pigment to binder weight ratio of 0.18 over a black and white background and prepared and measured according to established industry procedures. Such opacity is not reached by any previous 2,9-dichloroquinacridone magenta pigments.

The following examples illustrate various embodiments of the invention, but the scope of the invention is not limited thereto. In the examples, all parts are by weight unless otherwise indicated. The x-ray diffraction patterns are measured on a RIGAKU GEIGERFLEX diffractometer, type D/MaxII v BX. The coloristic data are obtained utilizing a CS-5 CHROMA SENSOR spectrophotometer as described above and the electron micrograph was taken on a Zeiss type 910 electron microscope.

EXAMPLE 1A

A 2,9-dichloroquinacridone crude with a specific surface area of 7.2 $m^2/g$ and a purity of 97.8% 2,9-dichloroquinacridone as determined spectrophotometrically, and which is obtained by the oxidation of 2,9-dichloro-6,13-dihydroquinacridone with hydrogen peroxide as the oxidant as described in U.S. Pat. No. 5,840,901 is premilled according to the following procedure:

A 1-SDG Attritor™ mill manufactured by Union Process, Inc. Akron, Ohio, fitted with L-arms and containing 3.78 liters of 0.6 cm diameter ceramic grinding media with 7.5 MOH hardness, 60–65 Rockwell 45 N hardness, 3.0 kg/cm impact strength and 8500 kg/cm compressive strength, is charged with 500 grams of the 2,9-dichloroquinacridone crude and the pigment is milled under a nitrogen flow at a rotation speed of 500 rpm for 60 minutes. At the conclusion of the milling cycle, the product is recovered by opening the valve at the bottom of the mill while rotation continues for 15 minutes yielding a brown highly aggregated powder with a low crystallinity.

EXAMPLE 1B

The procedure of Example 1A is repeated but charging the attritor with an additional amount of 75 grams anhydrous sodium sulfate yielding an homogenous brown highly aggregated powder with a low crystallinity, and which can be easily discharged in a high yield.

EXAMPLE 1C

A one liter flask equipped with a thermometer, stirrer and condenser is charged with 500 ml NMP and stirred at room temperature (20–27° C.). Fifty-five grams premilled 2,9-dichloroquinacridone powder according to Example 1A are slowly added. The suspension is thin and easily stirrable. Additional 50 ml NMP are added to rinse the funnel and the suspension is heated in 30 minutes to 150–153° C. and stirred at that temperature for 3 hours. The suspension is then stirred without heating for 30 minutes, allowing the temperature to decrease to 60–65° C., and it is finally filtered. The press cake is washed with methanol followed by water and dried yielding a high chroma, highly opaque magenta pigment which after pulverization can be employed in paints, inks and plastics.

Figure 3:
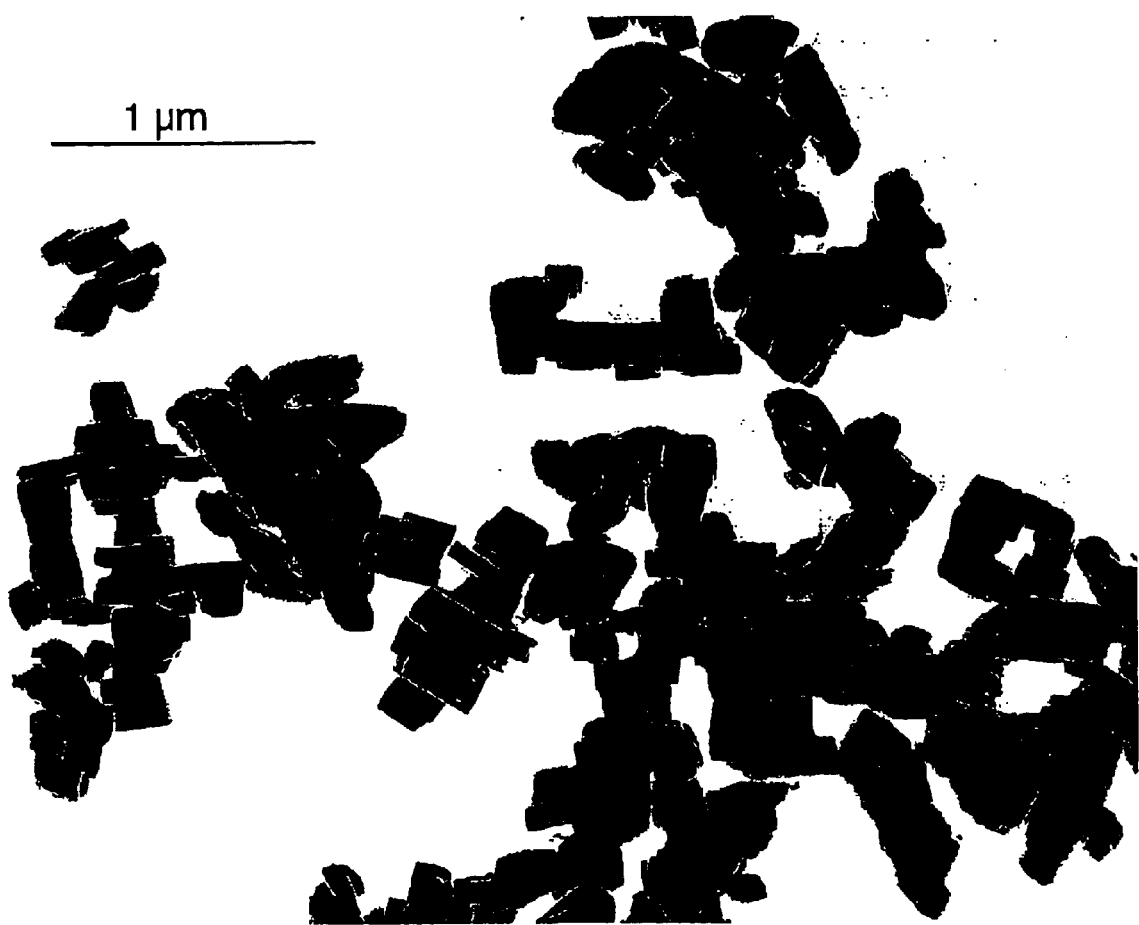
FIG. 3 is the electron micrograph of the 2,9-dichloroquinacridone obtained according to Example 1C.

The electron micrograph shows pigment particles with an isometric or orthorhombic shape (short rod-like with almost orthogonal axes) and with at least 90% of the particles keeping a width of 0.1–0.4 μm and a length of 0.1–0.8 μm as shown in FIG. 3.

The x-ray diffraction pattern shows the characteristic pattern of a gamma 2,9-dichloroquinacridone (FIG. 1) with the following data:

| SCATTERING ANGLE [°2θ] | RELATIVE INTENSITY [%] |
|---|---|
| 5.2 | 22 |
| 15.1 | 41 |
| 15.7 | 8 |
| 16.4 | 22 |
| 19.2 | 16 |
| 21.2 | 7 |
| 22.9 | 25 |
| 23.3 | 34 |
| 24.4 | 11 |
| 25.2 | 10 |
| 26.5 | 13 |
| 27.8 | 100 |
| 28.9 | 10 |

EXAMPLE 2

The procedure of Example 1C is repeated, using instead of NMP the same amount of dimethyl sulfoxide (DMSO) as the polar solvent, yielding a gamma 2,9-dichloroquinacridone with a similar color characteristic and similar good pigment properties.

EXAMPLE 3

The procedure of Example 1C is repeated, using the same amount of premilled 2,9-dichloroquinacridone powder according to Example 1B instead of premilled 2,9-dichloroquinacridone powder according to Example 1A, the same amount of dimethylformamide (DMF) as the polar solvent instead of NMP, and stirring the suspension at reflux temperature for 4 hours, yielding a gamma 2,9-dichloroquinacridone with a similar color characteristics and similar good pigment properties.

EXAMPLE 4

The procedure of Example 1C is repeated; however stirring the suspension for 3 hours at reflux, instead of stirring for 3 hours at 150 to 153° C., yielding a high chroma gamma 2,9-dichloroquinacridone magenta pigment having a slightly yellower shade versus the pigment prepared according to Example 1C but with similar good pigment properties.

EXAMPLE 5

This Example illustrates the incorporation of the instant gamma 2,9-dichloroquinacridone prepared according to Example 1C into an automotive paint system.

Millbase formulation: A pint jar (473.18 ml) is charged with 48 grams high solids acrylic copolymer polyol resin (68% solids, DU PONT), 10.5 grams acrylic A-B dispersant resin (55% solids, DU PONT) and 42.3 grams Solvesso 100 (American Chemical). 19.2 grams gamma 2,9-dichloroquinacridone obtained according to Example 1C and 240 grams of glass beads are added. The mixture in the jar is shaken on a Skandex shaker for 1 hour. The millbase contains 16.0% pigment with a pigment/binder ratio of 0.5 and a solids content of 48%.

Masstone color for spraying a panel: 43.7 grams of the above millbase, 25.4 grams of an unpigmented commercial automotive basecoat (blend of polyester/polyol resin, acrylic copolymer polyol resins, melamine resin, additives and solvent 47.8% solids, DU PONT), 17.3 grams of a melamine resin Cymel 327 (Cyanamid) and 14.0 grams of a commercial unpigmented automotive basecoat consisting of a blend of polyester/polyol, acrylic copolymer polyol and melamine resins, additives and solvent (58% solids, DU PONT) are mixed and diluted with a solvent mixture comprising 76 parts xylene, 21 parts butanol and 3 parts methanol to a spray viscosity of 20–22 seconds as measured by a #2 Fisher Cup.

The resin/pigment dispersion is sprayed onto a panel twice at 1½ minute intervals as basecoat. After 2 minutes, the clearcoat resin is sprayed twice at 1½ minute intervals onto the basecoat. The sprayed panel is then flashed with air in a flash cabinet for 10 minutes and then "baked" in an oven at 129° C. (265° F.) for 30 minutes, yielding a magenta colored panel. The coated panel has excellent weatherability as shown by the exposure data in an ATLAS weather-O-meter.

The following C.I.E. L*, C*, h color space values are measured on the coated panel using a D65 illuminant and 10 degree observer with a specular component included:

L*=37.5; C*=43.1; h=16.6.

Masstone color for an acrylic enamel drawdown: 47.3 grams of the above millbase, 36.4 grams of acrylic A-B dispersant resin (55% solids, DU PONT), 16.3 grams of an high solids acrylic copolymer polyol resin (68% solids, DU PONT) are mixed, yielding a resin/pigment dispersion with a concentration of 7.6% pigment in a pigment to binder ratio of 0.18 and a solid content of 49.7%.

The resin/pigment dispersion is drawn down onto a Leneta black and white chart from the Leneta Company using a 100 μm wet film applicator. The film is flashed in a flash cabinet for 15 minutes and baked for 10 minutes. The final thickness of the coating is 25 μm.

The following ΔE* number is measured over the black and white background: ΔE*=4.0. The hide is almost complete as seen with the naked eye.

The C.I.E. L*, C*, h color space values are obtained from the portion over white background using a D65 illuminant and 10 degree observer with a specular component included:

L*=36.7; C*=43.0; h=16.6.

EXAMPLE 6

63.0 grams of polyvinyl chloride, 3.0 grams epoxidized soy bean oil, 2.0 grams of barium/cadmium heat stabilizer, 32.0 grams dioctyl phthalate and 1.0 gram of the gamma 2,9-dichloroquinacridone pigment prepared according to Example 1C or 2 to 4 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive magenta shade and has excellent fastness to heat, light and migration.

EXAMPLE 7

Five grams of the gamma 2,9-dichloroquinacridone pigment prepared according to Example 1C, 2.65 grams ®CHI- MASORB 944LD (hindered amine light stabilizer), 1.0 gram ®TINUVIN 328 (benzotriazole UV absorber) and 2.0 grams ®IRGANOX B-215 Blend (anti-oxidant), all available from Ciba Specialty Chemicals Corporation, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 200, 250 and 300° C. Homogeneously colored chips which show a saturated reddish magenta color with practically no color differences are obtained. They have an excellent light stability.

The following C.I.E. L*, C*, h color space values are obtained on a chip molded at 200° C. using a D65 illuminant and 10 degree observer with a specular component included:

L*=40.5; C*=46.1; h=17.5.

EXAMPLE 8

1000 grams of polypropylene granules (DAPLEN PT-55® from Chemie Linz) and 10 grams of the gamma 2,9-dichloroquinacridone pigment obtained in Example 1C or 2–4 are thoroughly mixed in a mixing drum. The granules so obtained are melt spun at 260–285° C. to red filaments of good light fastness and textile fiber properties.

EXAMPLE 9

This Example illustrates the incorporation of the instant gamma 2,9-dichloroquinacridone prepared according to Example 1C into an automotive polyester/CAB enamel paint system.
Binder Solution (8.2% Binder):
41.0 CAB® 531.1 (Eastman Chem.), 20% in butyl acetate/xylene 2:1
1.5 NUODEX® 6 (zirkonium octoate, Nordmann, Rassmann, D-Hamburg)
18.5 Solvesso® 150 (Exxon)
21.5 butyl acetate
17.5 xylene Millbase formulation: A 250 ml jar is charged with 15.73 grams Dynapol® H 700-08 (Degussa-Hüls), 11.80 grams of the above freshly prepared binder solution, 11.80 grams Maprenal® MF 650 (Vianova Resins) and 2.67 grams dispersant Disperbyk® 161 (BYK Chemie). 8 grams gamma 2,9-dichloroquinacridone obtained according to Example 1C and 100 grams of glass beads are added. The mixture in the jar is shaken on a Skandex shaker for 1 hour. The millbase contains 16.0% pigment with a pigment/binder ratio of 1:2.25 and a solids (pigment+binder) content of 59%.

Masstone color for an PES/CAB enamel drawdown: 23.75 grams of the above millbase, 10.50 grams of Dynapol H 700-08, 7.87 grams of the above binder solution and 7.87 grams Maprenal MF 650 are mixed, yielding a resin/pigment dispersion with a concentration of 7.6% pigment in a pigment to binder ratio of 1:5.22 and a solid (pigment+binder) content of 47.3%.

The resin/pigment dispersion is drawn down onto a Leneta black and white chart from the Leneta Company using a 100 μm wet film applicator. The film is flashed in a flash cabinet for 30 minutes and then "baked" in an oven at 130° C. (266° F.) for 30 minutes. The final thickness of the coating is 28 μm.

The following ΔE* number is measured over the black and white background: ΔE*=5.4. This coloristic difference corresponds to a satisfactory hide.

The C.I.E. L*, C*, h color space values are obtained from the portion over white background using a D65 illuminant and 10 degree observer with a specular component included:

L*=38.2; C*=43.9; h=16.6.

Further examples: Of course, it is possible to vary the pigment concentration and the layer thickness. By increasing the pigment concentration for example to 10%, 15% or 20% by weight, it is possible to obtain a good hide already with thinner layers, for example only 20 μm, 15 μm or even 10 μm thick. This is only possible owing to the instant pigments' excellent rheology. The skilled artisan will easily fully appreciate all hitherto unworkable possibilities that the instant pigments enable him to reach.

What is claimed is:

1. A gamma 2,9-dichloroquinacridone pigment having particles with a specific surface area of 11–23 m²/g, which pigment comprises C.I.E. color space values in masstone of L*=35–42, C* is at least 40 and h=14–20, measured on a panel coated with an acrylic or polyester enamel coating of dry film thickness of 25±5 μm and pigment to binder weight ratio of 0.18 over a black and white background, which enamel coating having such opacity that a color difference ΔE* over the black and over the white background is less than or equal to 8.

2. A gamma 2,9-dichloroquinacridone pigment according to claim 1 comprising at least 90% of the primary particles with an average particle size in the range of 0.1 to 0.8 μm, wherein at least 60% of said particles have an average aspect ratio of length to width and/or height from 1:1 to 3:1.

3. A gamma 2,9-dichloroquinacridone pigment according to claim 1, which is characterized by C.I.E. color space values in masstone of L*=37–41, C*=42–47 and h=16–18.

4. A composition comprising a high molecular weight organic material in the range of $10^3$ to $10^8$ g/mol and an effective pigmenting amount of a gamma 2,9-dichloroquinacridone pigment according to claim 1.

5. A composition according to claim 4, wherein said high molecular weight organic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins, diene rubbers and copolymers thereof.

6. A composition according to claim 4, wherein said high molecular weight organic material is a plastic that is subsequently calendered, cast, molded or processed to fibers, or is an industrial or automotive paint or ink coating.

7. A process for coloring a high molecular weight organic material in the range of $10^3$ to $10^8$ g/mol, which comprises incorporating an effective pigmenting amount of a pigment according to claim 1 into the high molecular weight organic material.

8. A gamma 2,9-dichloroquinacridone pigment having primary particles comprising at least 90% of said primary particles with an average particle size in the range of 0.1 to 0.8 μm, wherein at least 60% of said particles have an average aspect ratio of length to width and/or height from 1:1 to 3:1.

9. A gamma 2,9-dichloroquinacridone pigment according to claim 8, wherein at least 60% of the primary particles have a length in the range of 0.1 to 0.8 μm and a shape with dihedral angle between opposite faces from 0° to about 20° and dihedral angles between contiguous faces from about 70° to 90°.

10. A gamma 2,9-dichloroquinacridone pigment according to claim 8, having a specific surface area of 11–23 m²/g.

11. A gamma 2,9-dichloroquinacridone pigment according to claim 8, which is characterized by C.I.E. color space values in masstone of L*=37–41, C*=42–47 and h=16–18.

12. A gamma 2,9-dichloroquinacridone pigment according to claim 9 having a specific surface area of 11–23 m²/g.

13. A process for the preparation of a gamma 2,9-dichloro-quinacridone pigment, comprising
　a) oxidizing a 2,9-dichloro-6,13-dihydroquinacridone with hydrogen peroxide to produce a 2,9-dichloro-quinacridone crude product;
　b) grinding the resulting 2,9-dichloroquinacridone crude product to form a premilled 2,9-dichloroquinacridone product;
　c) contacting the premilled 2,9-dichloroquinacridone product with a polar solvent;
　d) heating the premilled 2,9-dichloroquinacridone product and solvent mixture at a temperature greater than 60° C. to ripen the premilled 2,9-dichloroquinacridone product; and
　e) isolating the ripened 2,9-dichloroquinacridone pigment having particles with a specific surface area of 11–23 m²/g, which pigment is characterized by C.I.E. color space values in masstone of L*=35–42, C* at least 40 and h=14–20, measured on a panel coated with an acrylic or polyester enamel coating of dry film thickness of 25±5 μm and pigment to binder weight ratio of 0.18 over a black and a white background, which enamel coating has such opacity that the color difference ΔE* over the black and over the white background is less than or equal to 4.8.

14. A process according to claim 13, wherein said ripened pigment is characterized by C.I.E. color space values in masstone of L*=37–41, C*=42–47 and h=16–18.

15. A process according to claim 13, wherein the polar solvent is methyl acetamide, formamide, sulfolane, methyl formamide, di($C_1$–$C_8$-alkyl)sulfoxide, (N,N—$C_1$–$C_8$-alkyl)-formamide or N—$C_1$–$C_8$-alkyl-pyrrolidone.

16. A process for coloring a high molecular weight organic material in the range of $10^3$ to $10^8$ g/mol, which comprises incorporating an effective pigmenting amount of a pigment prepared according to claim 13 into a high molecular weight organic material.

17. A process according to claim 15, wherein the polar solvent is dimethyl sulfoxide, dimethyl formamide or N-methyl-pyrrolidone.

18. A process for the preparation of a gamma 2,9-dichloro-quinacridone pigment, comprising
　a) oxidizing a 2,9-dichloro-6,13-dihydroquinacridone with hydrogen peroxide to produce a 2,9-dichloro-quinacridone crude product;
　b) grinding the resulting 2,9-dichloroquinacridone crude product to form a premilled 2,9-dichloroquinacridone product;
　c) contacting the premilled 2,9-dichloroquinacridone product with a polar solvent;
　d) heating the premilled 2,9-dichloroquinacridone product and solvent mixture at a temperature greater than 60° C. to ripen the premilled 2,9-dichloroquinacridone product; and
　e) isolating the ripened 2,9-dichloroquinacridone pigment having primary particles comprising at least 60% of said primary particles with an average particle size in the range of 0.1 to 0.8 μm, wherein the average aspect ratio of length to width and/or height is from 1:1 to 3:1.

19. A process according to claim 18, wherein said ripened pigment is characterized by C.I.E. color space values in masstone of L*=37–41, C*=42–47 and h=16–18.

20. A process according to claim 18, wherein the polar solvent is methyl acetamide, formamide, sulfolane, methyl formamide, di($C_1$–$C_8$-alkyl)sulfoxide, (N,N—$C_1$–$C_8$-alkyl)-formamide or N—$C_1$–$C_8$-alkyl-pyrrolidone.

21. A process according to claim 20, wherein the polar solvent is dimethyl sulfoxide, dimethyl formamide or N-methyl-pyrrolidone.

22. A process for coloring a high molecular weight organic material in the range of $10^3$ to $10^8$ g/mol, which comprises incorporating an effective pigmenting amount of a pigment prepared according to claim 18 into a high molecular weight organic material.

* * * * *